United States Patent
Ziftci et al.

(10) Patent No.: US 9,176,731 B1
(45) Date of Patent: Nov. 3, 2015

(54) HEURISTICS FOR AUTOMATED CULPRIT FINDING

(71) Applicant: GOOGLE INC., Mountain View, CA (US)

(72) Inventors: Celal Ziftci, San Diego, CA (US); Vivek Ramavajjala, New York, NY (US)

(73) Assignee: GOOGLE INC., Mountain View, CA (US)

( * ) Notice: Subject to any disclaimer, the term of this patent is extended or adjusted under 35 U.S.C. 154(b) by 2 days.

(21) Appl. No.: 14/011,020

(22) Filed: Aug. 27, 2013

(51) Int. Cl.
   *G06F 11/36* (2006.01)
   *G06F 9/44* (2006.01)

(52) U.S. Cl.
   CPC .. *G06F 8/71* (2013.01); *G06F 8/73* (2013.01); *G06F 11/3604* (2013.01); *G06F 2201/84* (2013.01)

(58) Field of Classification Search
   None
   See application file for complete search history.

(56) References Cited

U.S. PATENT DOCUMENTS

| | | | | |
|---|---|---|---|---|
| 6,662,312 | B1 * | 12/2003 | Keller et al. | 714/38.14 |
| 7,503,037 | B2 * | 3/2009 | Banerjee et al. | 717/124 |
| 8,321,407 | B2 * | 11/2012 | Cohen et al. | 707/718 |
| 2005/0120299 | A1 * | 6/2005 | Murray et al. | 715/513 |
| 2005/0223357 | A1 * | 10/2005 | Banerjee et al. | 717/120 |
| 2009/0216712 | A1 * | 8/2009 | Cohen et al. | 707/2 |
| 2011/0055826 | A1 * | 3/2011 | Vidal et al. | 717/177 |
| 2011/0283270 | A1 * | 11/2011 | Gass et al. | 717/168 |
| 2013/0290960 | A1 * | 10/2013 | Astete et al. | 718/1 |
| 2014/0223416 | A1 * | 8/2014 | Cohen et al. | 717/123 |
| 2014/0282401 | A1 * | 9/2014 | Tsirkin | 717/123 |
| 2014/0310688 | A1 * | 10/2014 | Granshaw et al. | 717/123 |
| 2014/0325477 | A1 * | 10/2014 | Hawes | 717/120 |
| 2014/0337672 | A1 * | 11/2014 | Hanzaike et al. | 714/38.1 |

OTHER PUBLICATIONS

Ren, X., Change Impact Analysis of Java Programs and Applications, Dissertation, Graduate School, Rutgers University-New Brunswick, Oct. 2007, 129 pages, [retrieved on Mar. 25, 2015], Retrieved from the Internet: <URL:https://rucore.libraries.rutgers.edu/rutgers-lib/23844/pdf/1/>.*

Elbaum, S., et al., Code Churn: A Measure for Estimating the Impact of Code Change, Computer Science Department, University of Idaho, 1998, 8 pages, [retrieved on Oct. 31, 2014], Retrieved from the Internet: <URL:cse.unl.edu/~elbaum/papers/conferences/icsm98.pdf>.*

Ryder, B., et al., Change Impact Analysis for Object-Oriented Programs, Proceedings of the 2001 ACM SIGPLAN-SIGSOFT workshop on Program analysis for software tools and engineering, 2001, pp. 46-53, [retrieved on Mar. 25, 2015], Retrieved from the Internet: <URL:http://dl.acm.org/>.*

* cited by examiner

*Primary Examiner* — Thuy Dao
*Assistant Examiner* — Geoffrey St Leger
(74) *Attorney, Agent, or Firm* — Birch, Stewart, Kolasch & Birch, LLP

(57) ABSTRACT

A system and method for isolating one or more code changes which are suspected of causing a code failure are disclosed. An example system may include a backend, a frontend, and a datastore. A list of changes to a codebase may be received along with a list of test targets in the codebase that are failing and a snapshot of the codebase at the time when one or more of the codebase's tests started failing. A heuristic may be used to find the code changes causing the one or more code failures.

11 Claims, 8 Drawing Sheets

```
BuildWatcherConfiguration {
    Project {
        project_name = "sample_project"
        test_targets = ["//sample/test/target"]
        test_labels = ["nightly_test", "end_to_end", "automated", "continuous_build"]
        test_user = ["end_to_end_tester"]
    }
    Settings {
        heuristic_type = DEPENDENCY_BASED        // could be LOG_ANALYZER
        email_ids = ["developer1_email", "developer2_email"]
        email_frequency = IMMEDIATELY
        continuous_monitoring = ON
    }
}
```

FIG. 7

HEURISTICS FOR AUTOMATED CULPRIT FINDING

BACKGROUND

Engineering organizations may build large projects with huge codebases. Given the speed at which programmers add new code and change existing code in codebases, it is necessary to ensure that no code that causes errors, bad code, is checked in to the codebases. If bad code is checked in, it must be fixed as soon as possible. Typically each project has multiple tests that verify whether the project's codebase is functioning properly or if the code has errors. When tests pass, the code is assumed to be running normally. When tests fail, it is assumed that recent changes to the codebase caused errors in the code.

Automatic test platforms may continually run a project's tests using the latest versions of the project's codebase. These automatic test platforms are commonly used and can indicate when a project's codebase contains bad code. However, most test platforms are unable to provide information about which change to the project's codebase caused tests to fail and created errors in the codebase. Instead, programmers must monitor code health and notice failed tests. The programmers must investigate the causes of test failures manually and then fix the code problems. Such manual investigation is complicated by large number of code changes that may be submitted to the codebases in a short amount of time. Finding culprit code changes that create test failures can be extremely time-consuming and difficult.

SUMMARY

This specification describes technologies relating to finding code errors in general, and specifically to methods and systems for isolating code that causes problems in a codebase in a low-computing cost and time-sensitive manner.

In general, one aspect of the subject matter described in this specification can be embodied in a system and method for isolating one or more code changes that are suspected of causing a code failure in a codebase. An example system may include: one or more processing devices and one or more storage devices storing instructions that, when executed by the one or more processing devices, cause the one or more processing devices to receive a list of changes to the codebase, the list including all changes to the codebase starting at the time when the codebase's tests were all passing to a time when one or more of the codebase's tests began to fail; receive a list of test targets in the codebase that are failing; receive a snapshot of the codebase at the time when one or more of the codebase's tests started failing; and use a heuristic to find the code changes causing the one or more test failures. An example method may include steps similar to those performed by the example system.

These and other embodiments can optionally include one or more of the following features. A heuristic may include creating a dependency tree from the received snapshot of the codebase. For code changes in the received list of changes to the codebase, an impact of the code change on failing test targets may be calculated and the impacts for the code changes on failing test targets may be summed to generate a total impact of the change on the codebase. The code changes may then be sorted in order of impact after the total impact for each change is calculated. At least one compile or execution log may be used to find the code changes causing one or more test failures. A heuristic may include determining whether a test failure was caused by a compile failure or an execution failure. Determining whether the code failure was caused by a compile failure may include determining whether there is an execution log or if the execution log is empty. A root cause set may be generated from at least one log file. If a root cause set is generated, for code changes in the received list of changes to the codebase, for root causes in the root cause set, a list of source files modified by the change may be retrieved. For a modified source file, the minimum distance to the source file from the root cause and the impact of modifying the source file may be calculated. The impact of modified source files may be summed to find a total impact of the change on a root cause. Then the impact of the change on root causes may be summed to find a total impact of the change on the codebase. The code changes may then be sorted in order of impact and the sorted code change list may be returned. In some embodiments, the code failure may be determined to be caused by a compile failure. At least one compile log may then be used to generate a root cause set. The impact of modifying the source file may be determined by Gaussian (distance) where Gaussian( ) is a Gaussian function with a mean of 1 and a variance of 0.2.

In other embodiments, the code failure may be determined to be caused by an execution failure. At least one execution log may then be used to generate a root cause set. Generating a root cause set may include isolating source files that reported errors in the execution log and identifying targets that are parents of isolated source files. The impact of modifying the source files may be determined by the formula $k\_1*$Gaussian (distance, M, V) where $k\_1$ is a constant multiplier and Gaussian( ) is a Gaussian function with a mean M and a variance V. An example system may include a backend which includes one or more build watcher jobs used to find code changes that are suspected of causing one or more test failures in the codebase and a master that manages build watcher jobs. An example system may also include: a frontend which has an interface that provides a list of monitored codebases on a home page; a datastore that exposes an API for the backend and the frontend to communicate and store data; and an email sender configured to send an email to a set of email addresses after the code changes causing the one or more test failures have been found.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 7 is an example build watcher configuration.

DETAILED DESCRIPTION

Figure 1:
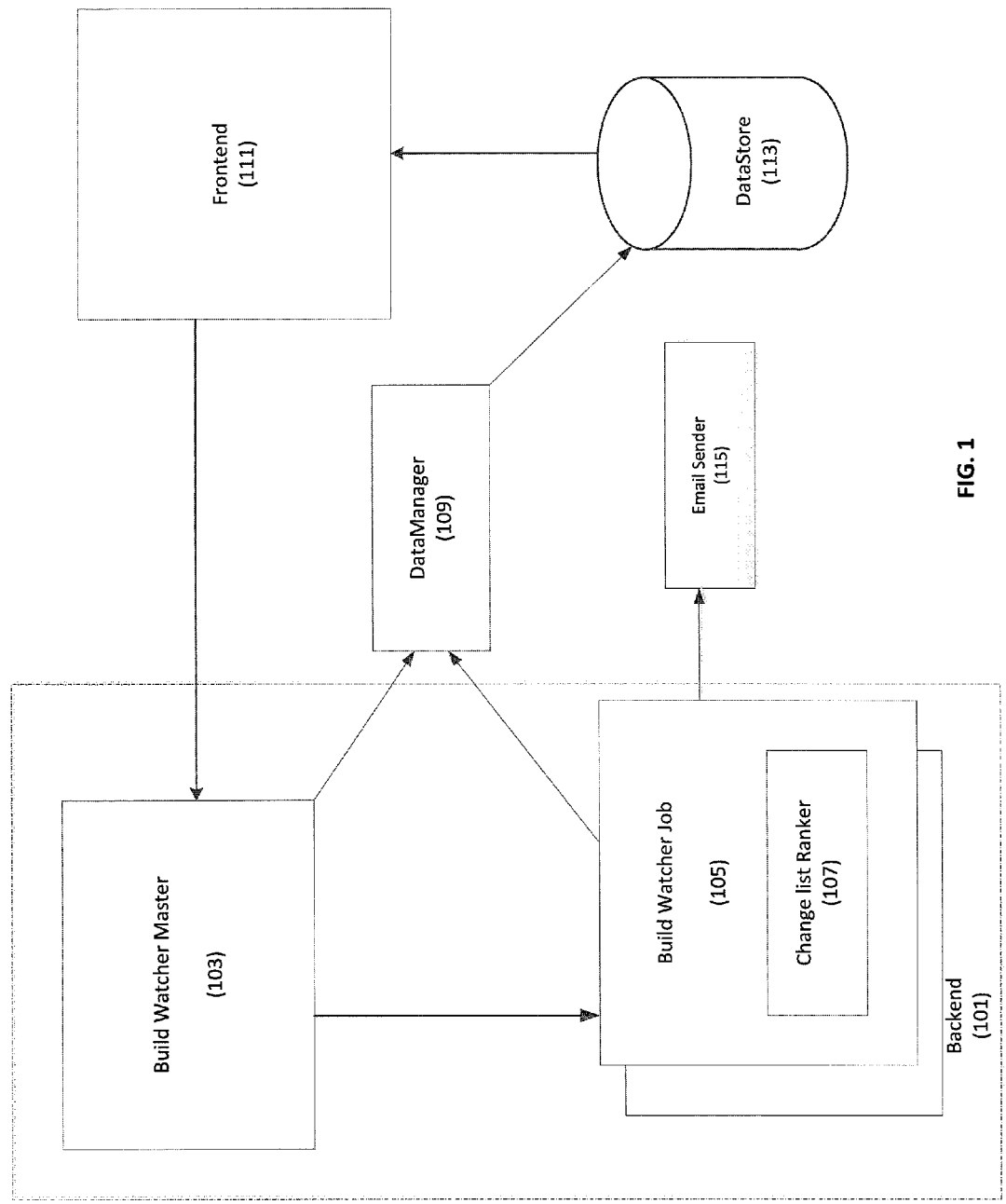
FIG. 1 is a block diagram illustrating an example system for isolating one or more code changes which are suspected of causing one or more code failures according to aspects of the inventive concepts.

An example system for isolating one or more code changes which are suspected of causing a code failure may have three primary components as illustrated in FIG. 1: (1) a backend (101); (2) a frontend (111), and (3) a datastore (113). The backend (101) may include a build watcher master (103) that is responsible for managing build watcher jobs (105) that watch the code builds and find potential culprit changes in the projects that they watch. The frontend (111) may include a user interface that provides a list of monitored projects on a home page and allows end users to view statistics and information about these projects. The datastore (113) may be a service with underlying hardware that exposes an application programming interface (API) that can be used by the frontend (111) and the backend (101) to store data.

Backend

An example backend may consist of two components: one or more build watcher jobs (105) and a build watcher master (103). Both of these components may use a build watcher configuration.

Build Watcher Configuration

A build watcher configuration object may include two sub-objects: a project which holds project-related details and a build watcher settings object that holds information related to monitoring the project's code. FIG. 7 illustrates an example build watcher configuration.

A project object may contain fields such as: (1) the name of the project to be monitored, (2) a list of targets to be monitored as part of the project, (3) labels to identify continuous build invocations, and (4) the user who is running the continuous build invocations.

A settings object may include: (1) the email address to which notifications should be sent regarding project monitoring, (4) options about when to send notification emails, (5) an optional ranking heuristic which may be used to find culprit code changes, and (6) an option to only perform a single investigation instead of continuous monitoring.

Build Watcher Job

A build watcher job (105) is a self-contained daemon that monitors a project for breakages or failures. Each build watcher job (105) may use a change list ranker object which is described below to find potential culprit changes that have broken or caused errors in the codebase. When a build watcher job (105) detects problems with project code, the build watcher job (105) may launch an investigation for identifying the changes responsible for the code errors.

A build watcher job (105) may be constructed using a build watcher configuration which is an object that specifies details for a particular build watcher job instance. A build watcher job (105) may also take in parameters for the internet protocol (IP) addresses at which to contact the build watcher master (103) and the datastore (113). A constructor initializes the build watcher job (105) with the specified configuration which may be provided by the build watcher master (103). This configuration may contain the necessary information for the build watcher job (105) to monitor a project. A build watcher job (105) may be able to update a configuration, monitor a project once or continuously, investigate why code is broken or failing, stop an investigation, stop monitoring a project, and run a change list ranker as discussed below.

A build watcher job (105) may instantiate an email sender (115) in order to send a notification email that describes the code changes that may have caused the code to fail or break. An email sender may be configured to send an email to a set of email addresses once the change list ranker (107) finishes its analysis on a failing build.

Change List Ranker

A change list ranker (107) may be an object that is instantiated by a build watcher job (105) in order to find a code change that has caused the code to fail or break. The change list ranker (107) class may be a generic with no instantiation specified.

A change list ranker (107) constructor may initialize the ranker class and prepare the instantiation for finding culprit code in a provided change list range. The change list ranker (107) may be provided with a front end updater object which may be instantiated by the build watcher job (105) and is capable of writing a list of things to the datastore (113). Specifically, the front end updater may allow the change list ranker (107) to update the datastore (113) with status updates that display current status in the ranking. The change list ranker (107) may include a function for ranking changes based on the score of the changes. The score may be a relative score and not an absolute indicator of how likely it is for a particular change to be the cause of a code problem.

Build Watcher Master

A build watcher master (103) may be a server that is responsible for managing build watcher jobs (105). Request for launching, pausing, stopping, or reconfiguring a build watcher job (105) may be received from an end user via the frontend (111) and may be processed by the build watcher master (103). A build watcher master (103) may perform several methods that may be invoked in order to manage build watcher jobs (105). A build watcher master (103) may monitor a new project, delete a project, start or stop monitoring, stop an investigation, configure a project, and shut down among other functions.

Frontend

An example frontend (111) according to aspects of the inventive concepts may include a user interface presenting a main page which lists projects being monitored and links each project to a corresponding project main page. Each project main page may include: (1) a historical timeline which contains the status of targets; (2) a list of broken or failed invocations of the code; (3) a hover over the list of code invocations to show a list of culprit changes; (4) a link from the code invocations links to the investigation page; and (5) a list of changes that potentially caused errors with an invocation that has yet to be investigated. A frontend (111) may additionally provide a project configuration page which may display the current project status of monitored or not, a field to enter an email at which to send monitor information, a field to enter a user, a field to enter labels, and an input area for target listings.

Datastore

In an example system, the datastore (113) may store data including: permanent data, project configurations, project statuses; results of past investigations for projects; and logging information. In an example embodiment, the datastore (113) may store two different types of data: (1) projects and (2) investigations. Project data may include project names, targets, labels, users, and email identifiers. Investigation data may include: a unique investigation identifier, updates from the change list ranker (107), final results from the change list ranker (107), and investigation parameters. The datastore (113) may be directly accessed by the frontend and may communicate with the backend (101) using remote procedural calls.

DataManager

An example datastore (113) may communicate with other services via a datamanager (109) class. In some embodiments, the datamanager (109) class may allow services except frontend services to communicate with the datastore. An example datamanager (109) may have several functions to manage project and investigation data. A datamanager (109) may add a new project, delete a project, update a project, store information about a new investigation, reset a current investigation, finish an investigation, or update an investigation status among other functions.

Figure 8:
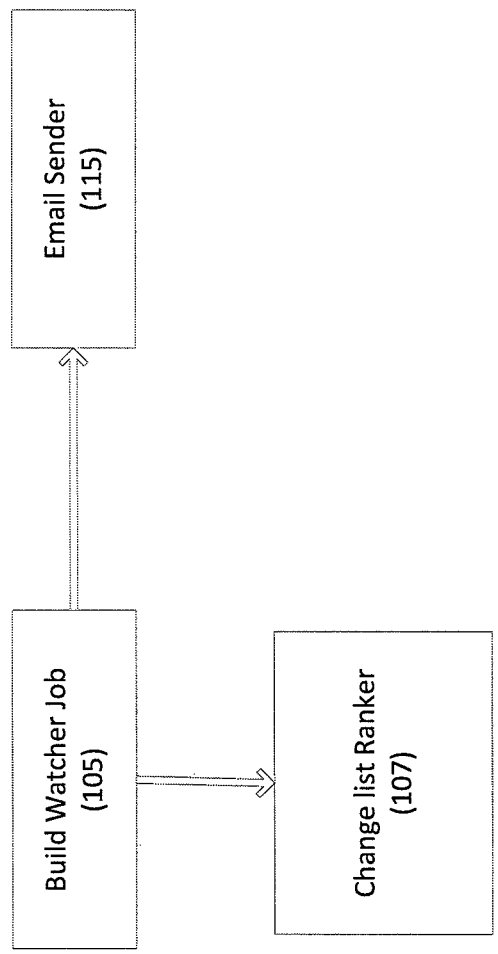
FIG. 8 is a block diagram illustrating an example system for isolating one or more code changes which are suspected of causing one or more code failures according to aspects of the inventive concepts.

Although FIG. 1 shows an example system with all of the above-described components, aspects of the inventive concepts may include a system with a single component or any combination of the described components. For example, as illustrated in FIG. 8, an example system may only include a build watcher job (105), a change list ranker (107), and an email sender (115).

Investigation

Figure 2:
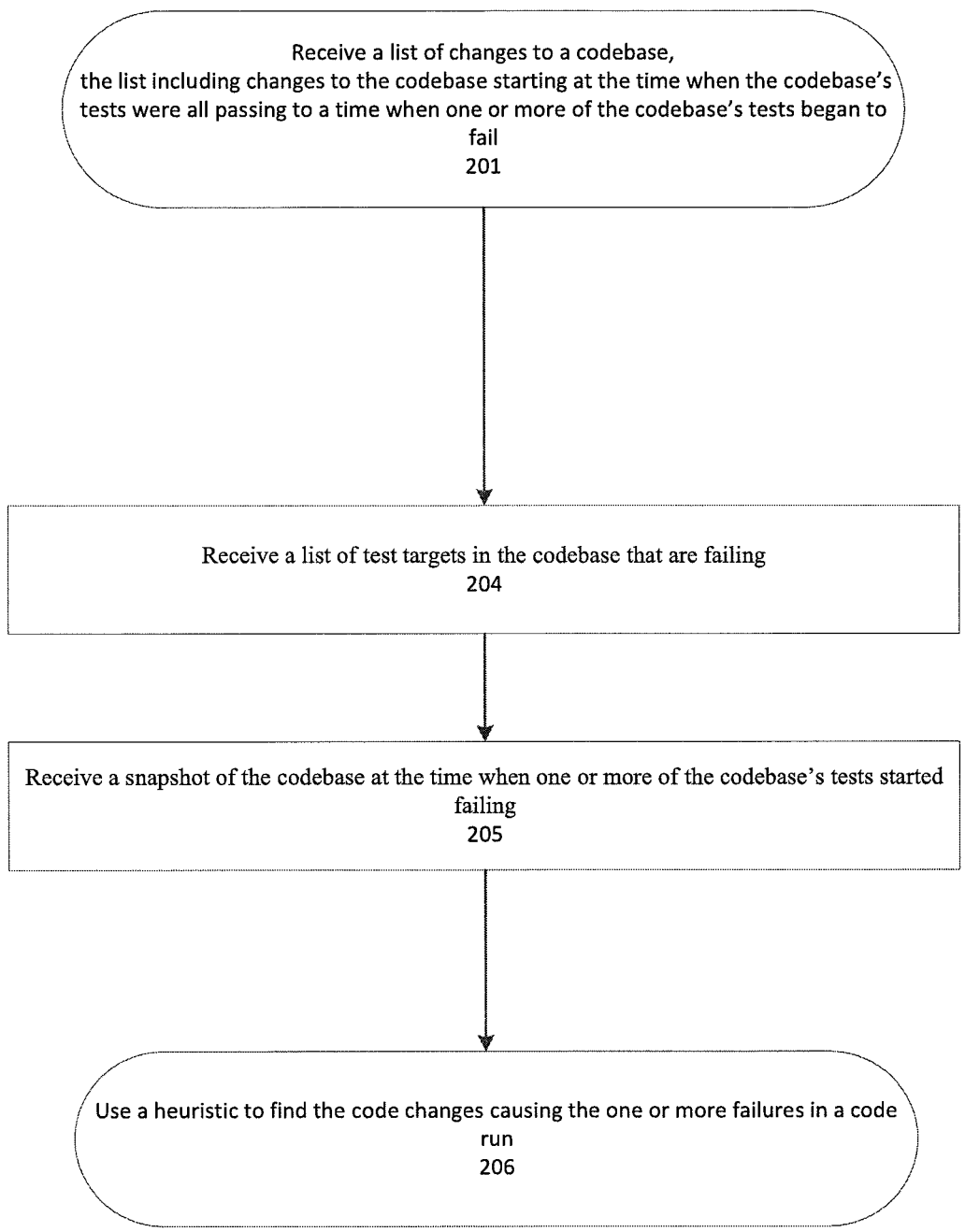
FIG. 2 is a flow diagram of an example method for isolating one or more code changes which are suspected of causing one or more code failures according to aspects of the invention.

As illustrated in FIG. 2, in an example embodiment, in order to perform an investigation, an example system may receive inputs such as: (1) a list of changes to a project's codebase which includes changes to the codebase starting at the time when the codebase's tests were all passing to a time when one or more of the codebase's tests began to fail (201) (2) a list of test targets that are failing (204); and (3) a snapshot of the codebase at the time one or more of the codebase's tests started failing (205). A heuristic may then be used to find the code changes causing the one or more failures in a code run (206). A custom heuristic may optionally be specified to analyze culprit code changes. An example heuristic may use the list of changes, the list of failing test targets, and the snapshot of the project's codebase to find the code changes causing code failures.

A list of changes to a project's codebase may be retrieved by the build watcher job (105) from the source control system being used to source control the codebase. For example, a project may use Github as a source control system. Any source control system, proprietary or otherwise, that keeps track of changes over time may be used to retrieve a list of the project's changes. An automated test framework may run tests on a project's codebase continuously. After each test, the test framework may report the last changes tested and whether the tests passed or not. The build watcher job (105) may monitor the results from this automated test framework. If the automated test framework reports a failure, the failure report typically includes the tests that failed. The build watcher job (105) may then use the report to start an investigation. The build watcher job (105) may create a snapshot of the codebase using the source control system. Creating a snapshot is a standard feature of most source control systems. Given a change in a codebase, the source control system may automatically create a snapshot of the codebase at that change.

Figure 3:
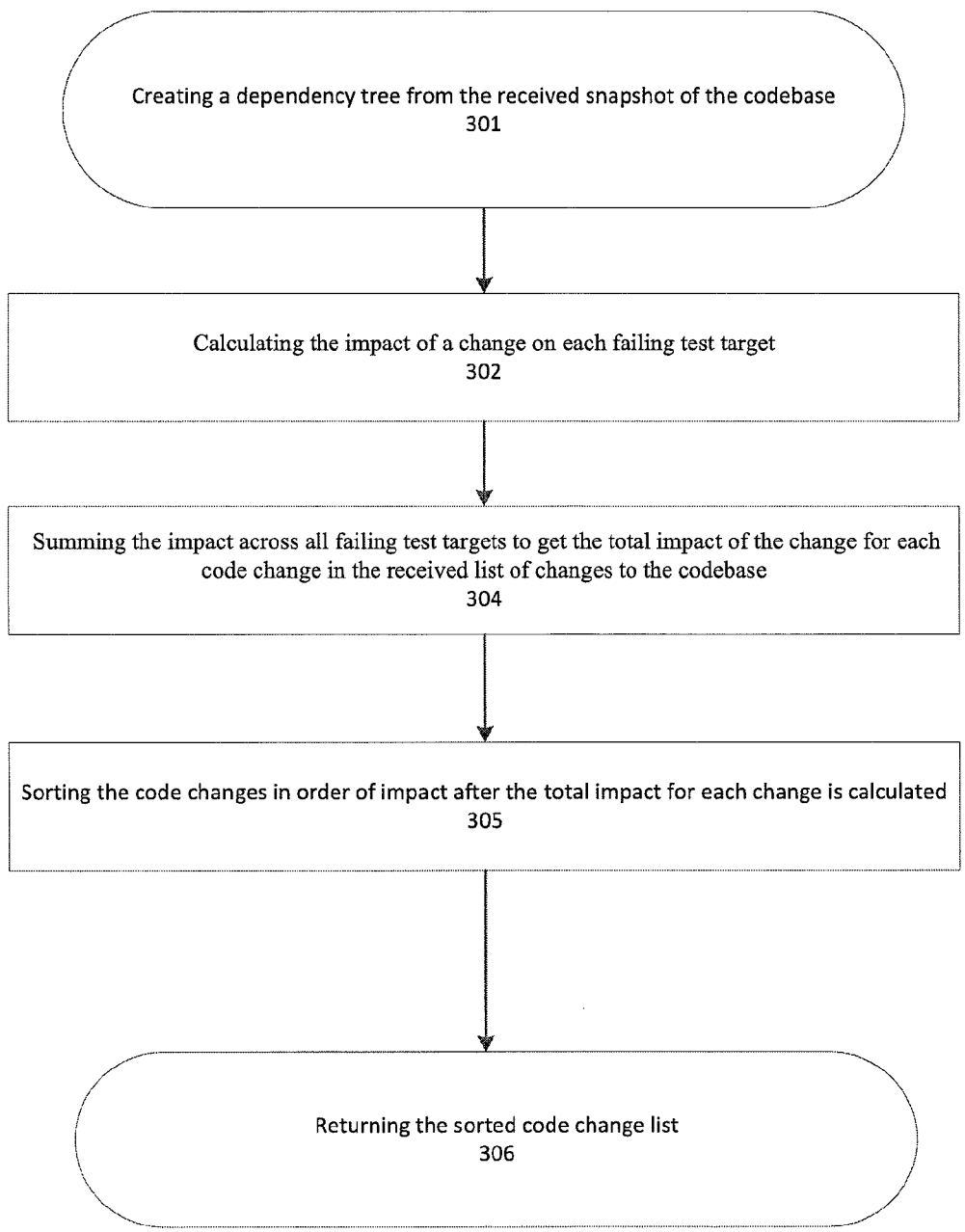
FIG. 3 is a flow diagram of an example method for finding the code changes causing one or more code failures according to aspects of the invention.
Figure 6:
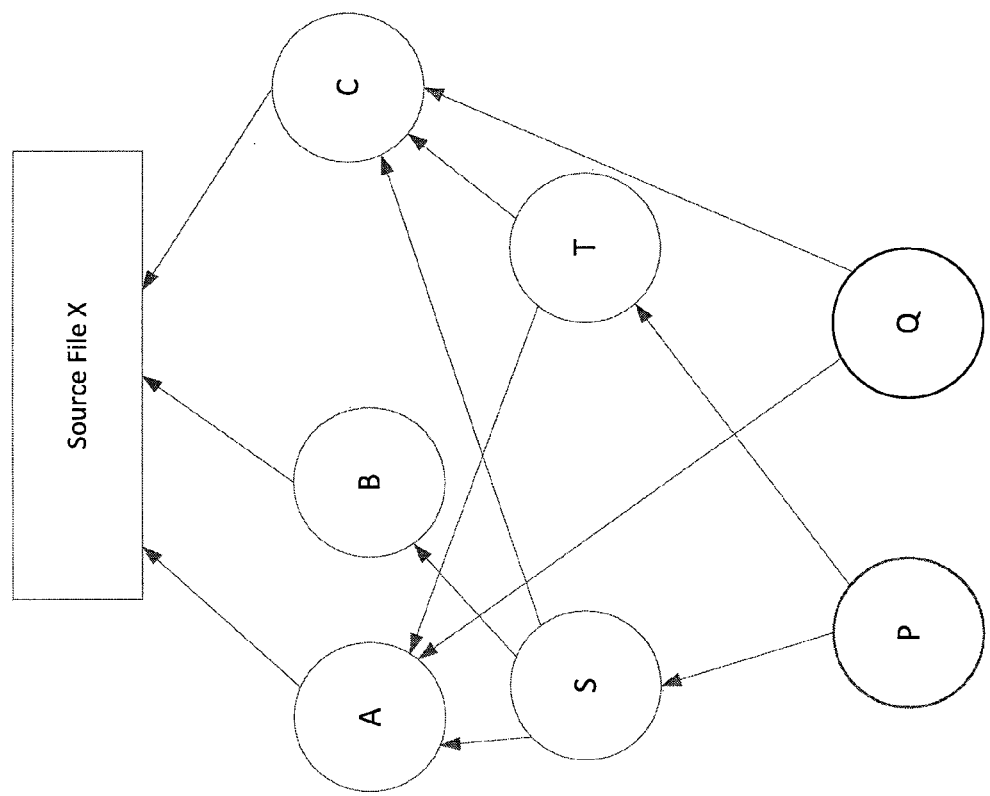
FIG. 6 is an example dependency tree.

If no custom heuristic is specified to analyze culprit code changes, an example system may use a default heuristic or a log-analyzer heuristic. For the default heuristic, the received snapshot of the codebase may be used to create a dependency tree as illustrated in FIG. 3 (301). A dependency tree is a data structure that contains information about code dependencies in a codebase. Source files in the codebase may be dependent upon other source files. The dependency tree may describe these dependencies as well as show the distance to a particular dependency from a source file. For example as illustrated in FIG. 6, a source file, X, may depend on source files A, B, and C. Source file A may depend on S, which depends on P, T, which also depends on P, and Q. Source file B may depend on S, which depends on P. Source file C may depend on S and T, which both depend on P, and Q. In this example, dependencies A, B, and C are at a distance 1 from source file X. Dependencies S, T, and Q are at a distance of 2 from X. Dependency P is at a distance of 3 from X.

The dependency tree may be constructed using build or make files. A single build file may list the dependencies from the source files within the directory in which the build file exists. By reading build files in each directory, the entire dependency tree may be constructed.

For each code change in the list of changes to the codebase that is inputted into the package, an example system may calculate the impact of the change on each failing test target as illustrated in FIG. 3 (302). The impact of a change on a test target may be a number that indicates how much the particular change modified the dependencies of the test target. The impact of a change on a single failing test target may be calculated by retrieving the list of sources modified by the change. For each modified source, the minimum distance of that source from the failing test target may be calculated. The impact of modifying the source may be given by the formula:

$$k\_1 * \text{Gaussian}(\text{distance}, M, V)$$

In the above formula, $k\_1$ may be a constant multiplier, Gaussian( ) may be a Gaussian function with mean M and variance V. The values of $k\_1$, M, and V may be determined experimentally. The impact of modifying all sources with a specific change may be added together to find the total impact of the change on the test target. As shown in FIG. 3, the impact of the change on all failing test targets may then be summed to find the total impact of the change on the project (304). After the total impact of each change is calculated, the code changes may be sorted in descending order or impact (305) and the list of sorted code changes may be returned (306). Although a Gaussian function is shown, any general similarity function may be used to calculate the impact of modifying the source. Similarity functions may have lower values if the distance is a high number and may have higher values if distance is a low number.

Figure 4:
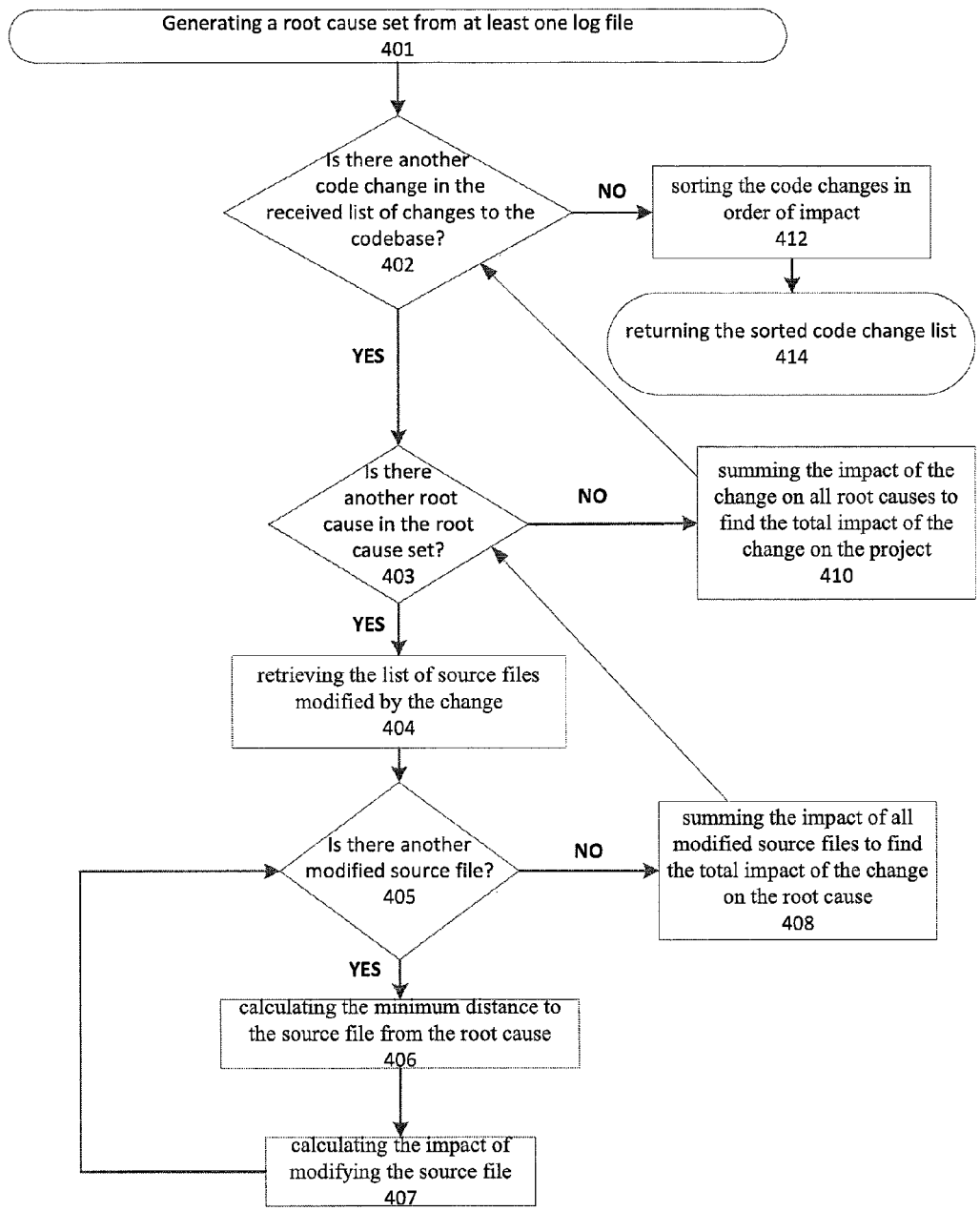
FIG. 4 is a flow diagram of an example method for finding the code changes causing one or more code failures according to aspects of the invention.

An alternate heuristic may be used if logs from failing tests are available as illustrated in FIG. 4. As with the default heuristic, an example system may receive inputs such as: (1) a list of code changes, (2) a list of failing test targets, and (3) a snapshot of the codebase when the tests starting failing. Additionally, the system may receive the compile and execution logs from the point when the tests started failing. The log-analyzer heuristic may execute the following steps to find code changes that have caused test failures.

As illustrated in FIG. 4, a log-analyzer technique may include generating a root cause set from at least one log file (401). The technique may go through each code change in the received list of changes to the codebase (402). For each root cause in the root cause set for a change (403), the technique may retrieve the list of source files modified by the change (404). For each modified source file (405), the technique may calculate the minimum distance to the source file from the root cause (406) using the dependency tree of the root cause and calculate the impact of modifying the source file (407). Then the technique may sum the impact of all modified source files to find the total impact of a given change on a root cause (408) and sum the impact of the change on all root causes to find the total impact of the change on the codebase (410). Code changes may then be sorted in order of impact (412) and the sorted code change list may be returned (414).

In an example embodiment, a determination may be made to decide whether code failed because of a compile failure or a test failure. A compile failure may be determined by checking the execution log. An empty or missing execution log may indicate that there was a compile failure. If there is an execution log, a log-analyzer may assume that there was an execution failure, but no compile failure.

If there were compile failures, a root cause set is generated from the compile logs. A root cause set is the set of all dependencies of the test target that failed to compile. For instance, if the dependency tree of X can be written as {X:(A, B, C), A:(P, Q), B:(S, T)}, and the targets C and T failed to compile, then the root cause set for X may be {C, T}. The root cause set may be determined by parsing the compile log. A target that fails to compile may be noted with an error message that may have the structure, "ERROR: Target <T> failed to compile with errors: <list of errors>." The syntax and keywords of the error messages may vary depending on the compiler used.

For each code change in the list of code changes, the impact of the change on each root cause may be calculated. This calculation may be similar to the dependency-based heuristic. However, the dependency tree that may be used in this calculation may be the dependency tree for the root cause as opposed to the dependency tree created for the failing test target in the dependency-based heuristic. The impact for a change "C" on a single root cause "X" may be calculated using the following steps. A list of sources modified by the change "C" may be retrieved. For each modified source, the minimum distance of that source from the root cause "X" may be calculated. The impact of modifying that source may be given by Gaussian (distance) where Gaussian ( ) may be Gaussian function with mean 1 and variance 0.1. The impact of modifying all sources in a change "C" may be added to get the total impact of the change "C" on the root cause "X." The impact of the change "C" on all of the root causes in the root cause set may be added to get the total impact of the change on the project. After the impact of all changes have been calculated, the changes may be sorted in descending order of impact and returned as possible code failure culprits.

If there were execution failures, a root cause set may be generated from the execution logs. The root cause set for execution failures may be the set of all targets in which associated source files reported errors in the execution logs. The root cause set may be generated by isolating the source files that reported errors in the execution log. Logging statements in execution logs may be classified by severity including: DEBUG, WARNING, INFO, ERROR, and FATAL. The root cause set may be generated by parsing the execution logs for any statements having severity ERROR or FATAL. Each logging statement may contain the source file that reported the error along with a timestamp. The parent targets of the isolated source files may then be identified. These parent targets may be identified by retrieving the entire dependency tree of the test target "X." Then, the parent target of a source file can be identified by finding that target for which the source file is an immediate dependency. For instance, if the dependency tree of X can be written as {X: (A, B, C), A: (P, Q), B: (S, T), P: (a.cc), Q: (test.cc), S: (s.cc), T: (t.cc), C: (runner.py)}, the source file a.cc is an immediate dependency of the target P. If a.cc was isolated from the execution log, then the target P would be added to the root cause set.

For each code change in the list of code changes, the impact of the change on each target in the root cause set may be calculated. The impact for a change "C" on a root cause "X" may be calculated using the following steps. A list of source files modified by the change "C" may be retrieved. For each modified source file, the minimum distance to that source file from the root cause "X" may be calculated. The impact of modifying the source may be given by the formula: $k\_1*Gaussian$ (distance, M, V) where $k\_1$ is a constant multiplier and Gaussian( ) is a Gaussian function with mean M and variance V. The values of $k\_1$, M, and V may be determined experimentally. Experimentation may involve using historically available data about successful culprit finding runs. Historical data may be collected manually, with a developer noting the change that was the culprit for a failing test target each time the test target failed. This historical data may be used to find values of $k\_1$, M, and V that consistently highly rank the true culprits. By trying a wide range of values, the set of values may be chosen that works well for ranking culprits in historical data. This set of values may then be used in the final tool. Experimentation may also be performed using a golden baseline, which is a known set of historical data collected automatically instead of manually. Regression testing can be performed to find the best set of values for the parameters under investigation that gives the closest match to the actual results in the golden baseline.

The impact of modifying all sources affected by a change "C" are added to get the total impact of that change "C" on the root cause "X." The impact of the change "C" on all test targets may be added to get the total impact of the change on the project. After the total impact for each change is calculated, the changes may be sorted in order of impact and returned as possible code failure culprits.

Figure 5:
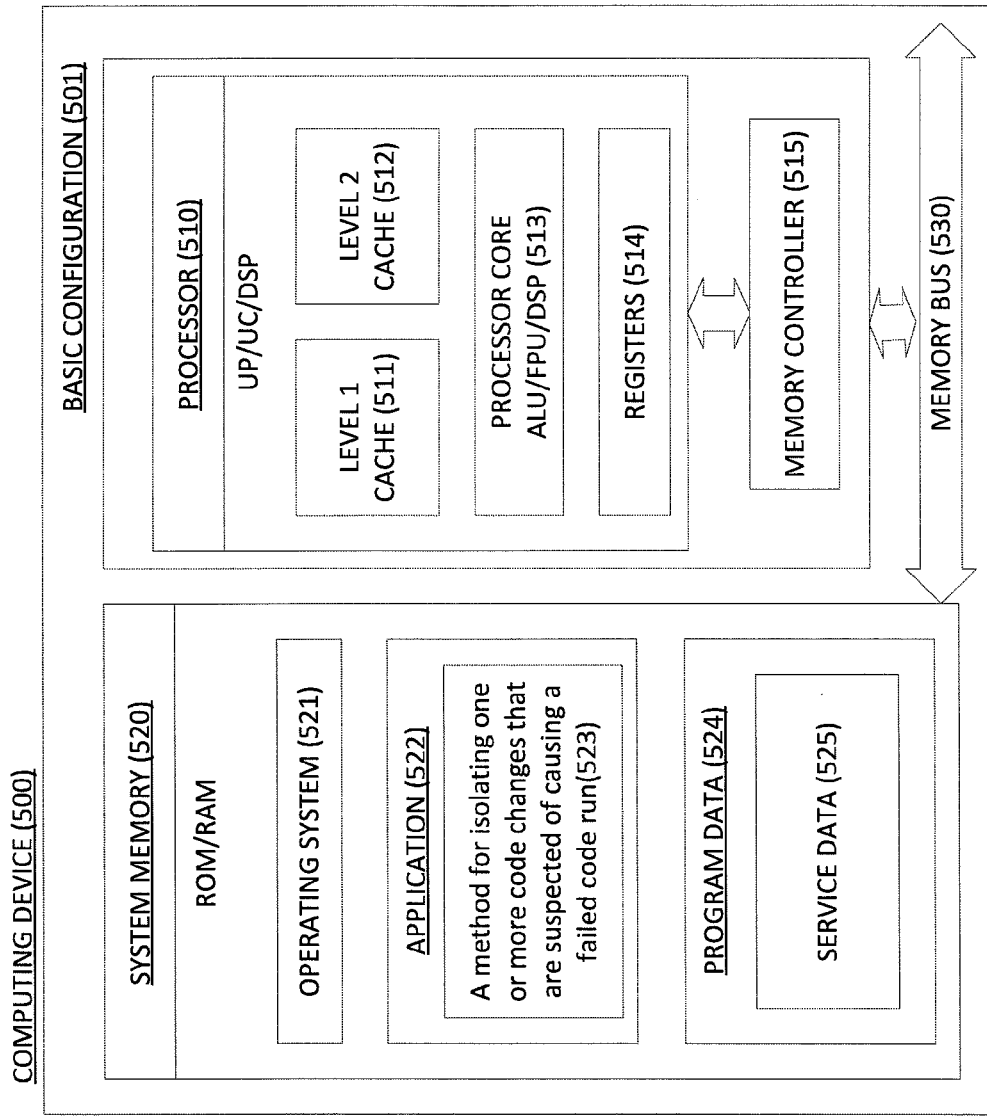
FIG. 5 is a block diagram illustrating an example computing device according to aspects of the invention.

FIG. 5 is a high-level block diagram of an example computer (500) that is arranged for isolating one or more code changes that are suspected of causing one or more test failures in a codebase. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (μP), a microcontroller (μC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a method for isolating one or more code changes that are suspected of causing one or more test failures in a codebase. Program Data (524) includes storing instructions that, when executed by the one or more processing devices, implement a method for finding culprit code changes (523). In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for isolating one or more code changes that are suspected of causing a code failure in a codebase, the system comprising:
    one or more processing devices; and
    one or more storage devices having at least a memory storing instructions that, when executed by the one or more processing devices, cause the one or more processing devices to:
    receive a list of changes to the codebase, the list including all changes to the codebase starting at the time when the codebase's tests were all passing to a time when one or more of the codebase's tests began to fail;
    receive a list of test targets in the codebase that are failing;
    receive a snapshot of the codebase at the time when one or more of the codebase's tests started failing;
    use at least one compile or execution log to find the code changes causing one or more test failures; and
    determine whether the test failure was caused by an execution failure by:
        generating a root cause set from at least one log file;
        for code changes in the received list of changes to the codebase:
            for root causes in the root cause set:
                retrieving a list of source files modified by the change;
                for a modified source file:
                    calculating the minimum distance to the source file from the root cause; and
                    calculating the impact of modifying the source file;
                summing the impact of modified source files to find a total impact of the change on the root cause;
            summing the impact of the change on root causes to find a total impact of the change on the codebase;
        sorting the code changes in order of impact; and
        returning the sorted code change list.

2. The system of claim 1, further comprising:
    responsive to determining that the code failure was caused by a compile failure, using at least one compile log to generate the root cause set.

3. The system of claim 2, wherein the impact of modifying the source file is determined by Gaussian (distance) where Gaussian( ) is a Gaussian function with a mean of 1 and variance of 0.1.

4. The system of claim 1, further comprising:
    responsive to determining that the code failure was caused by an execution failure, using at least one execution log to generate the root cause set.

5. The system of claim 4, wherein generating a root cause set further comprises:
    isolating source files that reported errors in the execution log; and
    identifying targets that are parents of isolated source files.

6. The system of claim 4, wherein the impact of modifying the source file is determined by the formula: $k\_1*$Gaussian(distance, M, V) where $k\_1$ is a constant multiplier and Gaussian( ) is a Gaussian function with a mean M and a variance V.

7. A computer-implemented method for isolating one or more code changes that are suspected of causing a code failure in a codebase, the method comprising:

receiving a list of changes to the codebase, the list including all changes to the codebase starting at the time when the codebase's tests were all passing to a time when one or more of the codebase's tests began to fail;
receiving a list of test targets in the codebase that are failing;
receiving a snapshot of the codebase at the time when one or more of the codebase's tests started failing;
use at least one compile or execution log to find the code changes causing one or more test failures; and
determine whether the test failure was caused by an execution failure by:
  generating a root cause set from at least one log file;
  for code changes in the received list of changes to the codebase:
    for root causes in the root cause set:
      retrieving a list of source files modified by the change;
      for a modified source file:
        calculating the minimum distance to the source file from the root cause; and
        calculating the impact of modifying the source file;
      summing the impact of the modified source files to find a total impact of the change on the root cause;
    summing the impact of the change on root causes to find a total impact of the change on the codebase;
  sorting the code changes in order of impact; and
  returning the sorted code change list.

8. The computer-implemented method of claim 7, further comprising:
responsive to determining that the code failure was caused by a compile failure, using at least one compile log to generate the root cause set.

9. The computer-implemented method of claim 7, further comprising:
responsive to determining that the code failure was caused by an execution failure, using at least one execution log to generate the root cause set.

10. The computer-implemented method of claim 9, wherein generating a root cause set further comprises:
isolating source files that reported errors in the execution log; and
identifying targets that are parents of isolated source files.

11. The computer-implemented method of claim 9, wherein the impact of modifying the source file is determined by the formula: $k\_1 * \text{Gaussian}(\text{distance}, M, V)$ where $k\_1$ is a constant multiplier and Gaussian( ) is a Gaussian function with a mean $M$ and a variance $V$.

* * * * *